United States Patent
Nunez et al.

(10) Patent No.: US 9,075,187 B2
(45) Date of Patent: *Jul. 7, 2015

(54) FULLY POLYMERIZED UV BLOCKING SILICONE HYDROGEL LENS

(71) Applicant: Bausch & Lomb Incorporated, Rochester, NY (US)

(72) Inventors: Ivan M. Nunez, Penfield, NY (US); Jennifer Hunt, Batavia, NY (US)

(73) Assignee: Bausch & Lomb Incorporated, Rochester, NY (US)

( * ) Notice: Subject to any disclaimer, the term of this patent is extended or adjusted under 35 U.S.C. 154(b) by 4 days.

This patent is subject to a terminal disclaimer.

(21) Appl. No.: 13/722,054

(22) Filed: Dec. 20, 2012

(65) Prior Publication Data

US 2013/0314664 A1 Nov. 28, 2013

Related U.S. Application Data

(63) Continuation-in-part of application No. 13/480,648, filed on May 25, 2012, now Pat. No. 8,807,745.

(51) Int. Cl.
*G02C 7/04* (2006.01)
*G02B 1/04* (2006.01)

(52) U.S. Cl.
CPC . *G02B 1/043* (2013.01); *G02C 7/04* (2013.01)

(58) Field of Classification Search
CPC .......... G02B 1/043; G02B 3/14; G02B 5/208; G02C 7/04
USPC ........................ 351/159.02, 159.033, 159.034
See application file for complete search history.

(56) References Cited

U.S. PATENT DOCUMENTS

| | | | |
|---|---|---|---|
| 3,808,179 A | 4/1974 | Gaylord | |
| 5,070,215 A | 12/1991 | Bambury et al. | |
| 5,135,965 A | 8/1992 | Tahan | |
| 5,270,418 A | 12/1993 | Kunzler et al. | |
| 5,610,252 A | 3/1997 | Bambury et al. | |
| 6,921,802 B2 | 7/2005 | Künzler et al. | |
| 7,461,937 B2 | 12/2008 | Steffen et al. | |
| 2005/0079096 A1 | 4/2005 | Brown-Skrobot et al. | |
| 2005/0148682 A1 | 7/2005 | Hu et al. | |
| 2006/0072069 A1 | 4/2006 | Laredo et al. | |
| 2007/0296914 A1* | 12/2007 | Hong et al. | ............... 351/160 H |
| 2008/0174035 A1 | 7/2008 | Winterton | |

(Continued)

FOREIGN PATENT DOCUMENTS

| | | |
|---|---|---|
| WO | 03/022322 A2 | 3/2003 |
| WO | 2007/146137 A2 | 12/2007 |
| WO | 2011/037897 A2 | 3/2011 |

OTHER PUBLICATIONS

International Search Report in corresponding International Application No. PCT/US2013/041749 mailing date Jul. 24, 2013 (3 pages).

(Continued)

*Primary Examiner* — Scott J Sugarman
(74) *Attorney, Agent, or Firm* — Toan P. Vo

(57) ABSTRACT

A substantially fully copolymerized UV blocking hydrogel lens demonstrating sufficient blocking of UV light to meet at least FDA Class II specifications for UV blocking formed from a reaction mixture comprising at least NVP and one other comonomer and a free-radical polymerizable, substituted or unsubstituted, Bis O-hydroxy benzophenone is provided herein.

12 Claims, 2 Drawing Sheets

(56) References Cited

U.S. PATENT DOCUMENTS

| | | |
|---|---|---|
| 2010/0120938 A1* | 5/2010 | Phelan et al. ............... 523/107 |
| 2010/0258961 A1* | 10/2010 | Chang et al. ............... 264/1.38 |
| 2010/0304163 A1 | 12/2010 | Nueraji et al. |
| 2011/0009658 A1 | 1/2011 | Awasthi et al. |
| 2012/0026458 A1* | 2/2012 | Qiu et al. ............... 351/160 H |
| 2012/0088861 A1* | 4/2012 | Huang et al. ............... 523/107 |
| 2013/0026457 A1 | 1/2013 | Joo et al. |
| 2013/0313733 A1 | 11/2013 | Nunez et al. |
| 2013/0314663 A1 | 11/2013 | Nunez et al. |

OTHER PUBLICATIONS

Written Opinion of the International Searching Authority in corresponding International Application No. PCT/US2013/041749, mailing date Jul. 24, 2013 (4 pages).

Office Action received in corresponding U.S. Appl. No. 13/480,648 dated Aug. 1, 2013 (17 pages).

Office Action received in corresponding U.S. Appl. No. 13/480,651 dated Apr. 4, 2014 (35 pages).

* cited by examiner

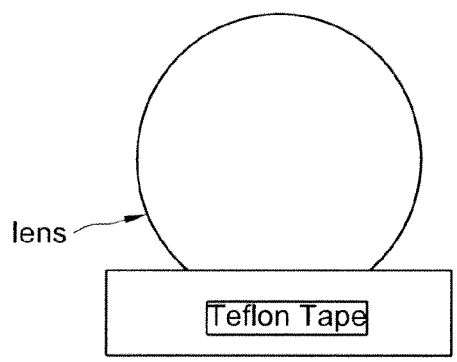
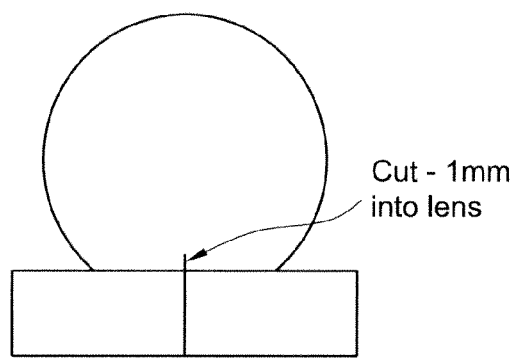
FIG. 1A    FIG. 1B
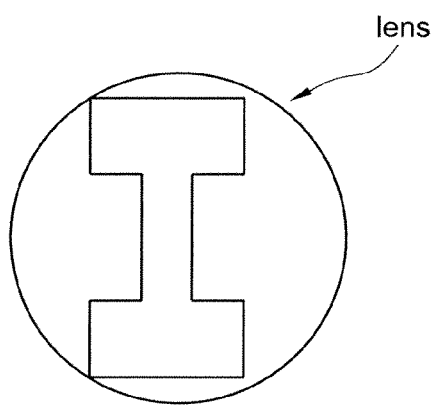
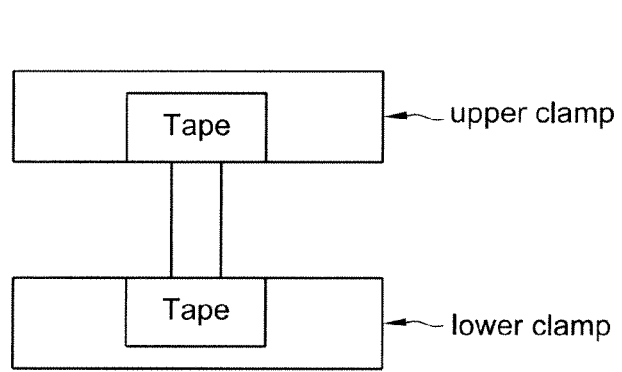
FIG. 2A    FIG. 2B

US 9,075,187 B2

FULLY POLYMERIZED UV BLOCKING SILICONE HYDROGEL LENS

CROSS REFERENCE

This application is a continuation-in-part patent application of patent application having Ser. No. 13/480,648, filed on May 25, 2012, which is a non-provisional patent application. This application claims the benefit of application Ser. No. 13/480,648, which is incorporated herein by reference in its entirety.

FIELD

The present invention relates to ophthalmic devices, and more particularly to a method of making a substantially fully polymerized UV blocking hydrogel lens comprising polymerizing a monomer mixture of at least NVP and one other comonomer and a free-radical polymerizable, substituted or unsubstituted, Bis o-hydroxy benzophenone to provide a hydrogel ophthalmic device having a wettable surface and sufficient blocking of UV light to meet at least Class II specifications for UV blocking.

BACKGROUND

Development of a commercially successful ophthalmic device formed from traditional silicone hydrogel materials frequently requires post cure generation of a wettable surface. Traditional silicone hydrogel contact lenses may demonstrate surfacing of silicone chains, i.e., silicone rich domains residing on the surface of a lens. Surfacing of silicone chains can create hydrophobic areas on the lens surface. These surface hydrophobic areas may adversely impact lens wettability. Post cure treatment of the lens surface to enhance wettability is effective but expensive; the additional step(s) add cost and time to the manufacturing process. An alternative to post cure treatment of the surface is incorporation of polyvinylpyrrolidone (PVP) of relatively high molecular weight (for example >300 kDa) into the device by adding it to the monomer mix before curing. The resulting material has entangled non-covalently incorporated PVP which, because of its high molecular weight, will not easily leach out of a hydrated lens. Other methods of providing hydrophilic polymers such as PVP, a polymerized device are still needed.

Incorporation of substantial amounts of relatively slow reacting hydrophilic monomers such as N-vinylpyrrolidone (NVP) along with faster reacting comonomers in the monomer mix may create a successful ophthalmic device by formation of chains of primarily homo-polyvinylpyrrolidone (PVP) in situ as the device cures. However, monomers typically found in ophthalmic device forming monomer mixes may include relatively slow reacting monomers such as NVP, O-vinyl carbonates (e.g., 2-hydroxyethyl vinyl carbonate and 2-(dimethylamino)ethyl vinyl carbonate), O-vinyl esters (e.g. vinylacetate), O-allyl esters (e.g., allyl acetate), O-allyl carbonates (e.g., allyl (2-(dimethylamino)ethyl)carbonate) and N-vinyl carbamates (e.g., 2-methoxyethyl vinylcarbamates), as well as relatively faster reacting monomers such as acrylates, methacrylates, acrylamides, methacrylamides and styrenics. In device forming systems containing mixtures of fast and slow reacting monomers (such as may be found in monomer mixes for forming silicone hydrogels) a difference in the reaction mechanism and therefore the reaction kinetics of the device forming system (e.g., addition to C=C vs. hydrogen atom transfer) makes such systems particularly susceptible to incomplete cure. Therefore, the relatively sensitive kinetics of the curing reaction in these device forming systems makes creating a successful ophthalmic device difficult.

U.S. Pat. No. 5,135,965 discloses certain monomer mixes containing N-vinylpyrrolidone (NVP) and UV-absorbers capable of being bound to the device after reaction and extraction for intraocular lens applications. The formulations disclosed in U.S. Pat. No. 5,135,965 are not silicone hydrogels.

SUMMARY

Disclosed herein is a method of making a substantially fully polymerized UV blocking hydrogel lens comprising polymerizing a monomer mixture of at least one monomer selected from the group consisting of NVP, O-vinyl carbonates such as 2-hydroxyethyl vinyl carbonate, O-vinyl esters such as vinylacetate, O-allyl esters such as allyl acetate, O-allyl carbonates such as allyl (2-(dimethylamino)ethyl)carbonate, N-vinyl carbamates such as 2-methoxyethyl vinylcarbamate, O-vinyl carbamates such as Vinal acid also known as 3-(((vinyloxy)carbonyl)amino)propanoic acid, N-vinyl ureas such as 1-(2-hydroxyethyl)-3-vinylurea and 1-allyl-3-(2-hydroxyethyl)urea, N-allyl carbamates such as 2-hydroxyethyl allylcarbamate, O-allyl carbamates such as allyl (2-hydroxyethyl)carbamate and mixtures thereof and at least one other comonomer and a free-radical polymerizable, substituted or unsubstituted, Bis o-hydroxy benzophenone to provide a hydrogel ophthalmic device having a wettable surface and sufficient blocking of UV light to meet at least Class II specifications for UV blocking. FDA Class II blocker rated contact lenses are recommended by the American Optometric Association for general purposes use. These lenses must block more than 70% of UVA and 95% of UVB to be considered to be FDA Class II UV blockers. More preferably the method of the invention herein provides a substantially fully polymerized UV blocking silicone hydrogel having large chains of hydrophilic polymer, preferably polyvinylpyrrolidone (PVP) formed in situ during cure.

In yet another aspect, the invention includes articles prepared by the method disclosed herein. The method of the invention herein is applicable to preparing a wide variety of polymeric materials, either rigid or soft. Especially preferred polymeric materials are lenses including contact lenses, phakic and aphakic intraocular lenses and corneal implants although all polymeric materials including biomaterials are contemplated as being within the scope of this invention. Preferred articles prepared by the method disclosed herein are optically clear and useful as a contact lens.

BRIEF DESCRIPTION OF THE DRAWINGS

FIG. 1A is a representation of teflon taped Tear specimen as cut from a spherical contact lens; FIG. 1B is a representation of the specimen shown in 1A with the slit cut and ready to be placed in the clamps of an Instron 4502.

FIG. 2A is a representation of the die for cutting the dogbone shaped tensile specimens from the contact lens; FIG. 2B is a representation of mounting the Tear specimen in the clamps of an Instron 4502.

DETAILED DESCRIPTION

Figure 3:
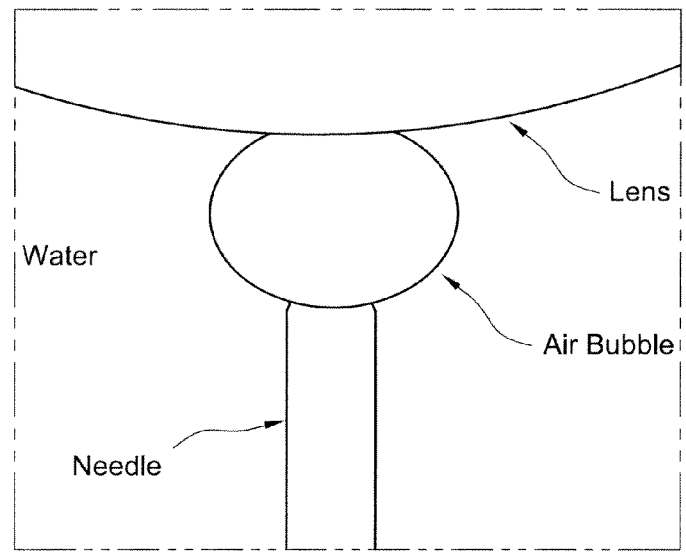
FIG. 3 is a photograph of Typical Bubble Geometry For Captive Bubble Contact Angle Measurement Using the Contact Lens to Capture the Bubble.

Unless clearly stated otherwise all materials used in forming a monomer mix according to the invention herein are listed as weight percent. Also, unless clearly stated otherwise, it will be understood that all amounts of materials used to make the monomers and monomer mixes disclosed herein represent the statistical mean of a normal distribution of weight values as ordinarily encountered in the laboratory or commercial manufacture of the monomers and monomer mixes disclosed herein. Therefore, unless clearly stated otherwise, all numerical values shall be understood as being modified by the term "about".

The expression "substantially fully polymerized" as used herein means the results obtained through Photo Differential Scanning Calorimetry (DSC) analytical demonstrate whether a monomer system is "substantially fully polymerized". DSC provides a measure of C=C conversion. The heat evolved is proportional to the molar amount of C=C converted into single bonds (i.e. polymerized). You can actually calculate, based on the molar heat of polymerization of methacrylates (which doesn't change much with structure) how much heat a given mix will generate if the mix is 100% converted, i.e., substantially polymerized. You can also measure the exotherm of the mix with and without the polymerization inhibiting substance (SA monomer in this case) and look for differences between the comparative example and the control example. In this approach one does not need to know the heat of polymerization. Other analytical techniques which can be used to demonstrate the monomer system is "substantially fully polymerized" may exist or be developed in the future.

The term "monomer" as used herein refers to varying molecular weight compounds (i.e. typically having number average molecular weights from about 700 to about 100,000) that can be polymerized. In addition, the term "monomer" as used herein refers to medium to high molecular weight compounds, sometimes referred to as macromonomers, (i.e., monomers typically having number average molecular weights greater than 700) containing functional groups capable of further polymerization. Prepolymers are partially polymerized monomers which are capable of further polymerization. Thus, it is understood that the terms "organosilicon-containing monomers", "silicone-containing monomers" and "hydrophilic monomers" include monomers, macromonomers and prepolymers.

An "organosilicon-containing monomer" contains at least one [—Si—O—] or at least one [—Si—($C_2$-$C_7$ alkyl)-Si—O—] repeating units, in a monomer, macromonomer or prepolymer. Preferably, the total Si and attached O are present in the organosilicon-containing monomer in an amount greater than 5 weight percent, and more preferable greater than 30 weight percent of the total molecular weight of the organosilicon-containing monomer. A "silicone-containing monomer" is one that contains at least one [—Si—O—] repeating units, in a monomer, macromonomer or prepolymer.

Monomers typically found in ophthalmic device forming monomer mixes include slower reacting monomers such as N-vinylpyrrolidone (NVP), O-vinyl carbonates, O-vinyl esters (e.g. vinylacetate), O-allyl esters, O-allyl carbonates and N-vinyl carbamates, as well as faster reacting monomers such as acrylates, methacrylates, acrylamides, methacrylamides and styrenics. In device forming systems containing mixtures of fast and slow reacting monomers (such as may be found in monomer mixes for forming silicone hydrogels) a difference in reaction behavior (e.g., free radical cure vs. hydrogen atom transfer) makes such systems particularly susceptible to incomplete cure. The relative sensitivity of the curing process of these device forming systems makes creating a successful ophthalmic device difficult. Incorporation of substantial amounts of relatively slow reacting hydrophilic monomer such as NVP along with faster reacting comonomers in the monomer mix according to the invention herein may create a successful ophthalmic device by formation of chains of primarily homo polyvinylpyrrolidone (PVP) in situ as the device cures.

The use of UV blockers in ophthalmic devices is known. UV light in the 210-315 nm range may cause corneal damage. Thus, ocular devices containing UV absorbers are desirable, in particular for those patients spending considerable time outdoors. Functionalized benzotriazole-type UV absorbers (for example those of Structural Formulae I-IV) have been commonly used as UV blockers for thin articles like contact lenses because of their relatively high extinction coefficient in the UV-region.

Formula I

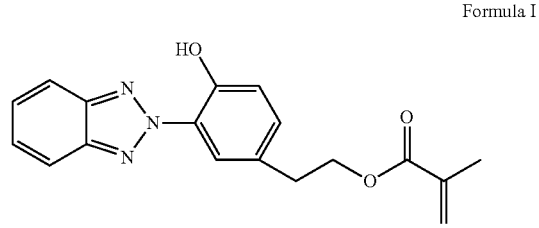

3-(2H-benzo[d][1,2,3]triazol-2-yl)-4-hydroxyphenethyl methacrylate

Formula II

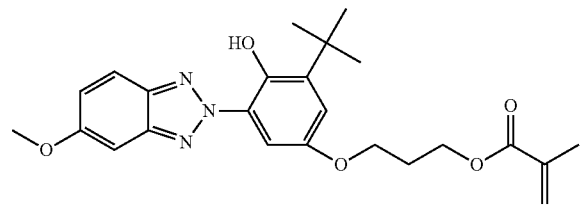

3-(3-(tert-butyl)-4-hydroxy-5-(5-methoxy-2H-benzo[d][1,2,3]triazol-2-yl)phenoxy)propyl methacrylate Formula III 3-(3-(tert-butyl)-5-(5-chloro-2H-benzo[d][1,2,3]triazol-2-yl)-4-hydroxyphenyl)propyl methacrylate Formula IV N-(4-hydroxy-3-(5-methoxy-2H-benzo[d][1,2,3]triazol-2-yl)phenyl)methacrylamide

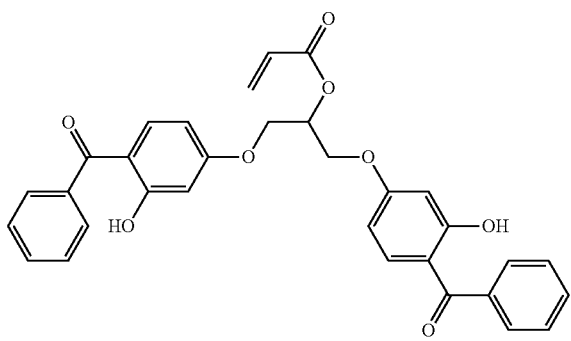

1,3-bis(4-benzoyl-3-hydroxyphenoxy)-2-propyl acrylate

Formula VI (BPM-2)

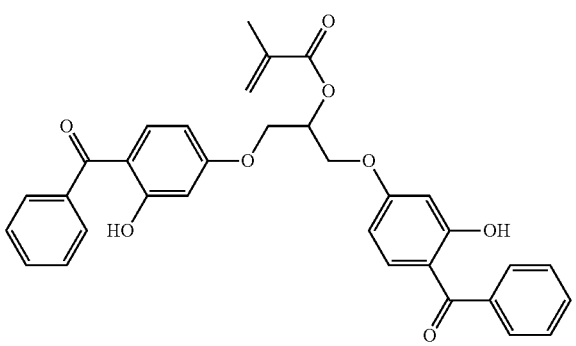

1,3-bis(4-benzoyl-3-hydroxyphenoxy)-2-propyl methacrylate

Formula VII (BPA-1)

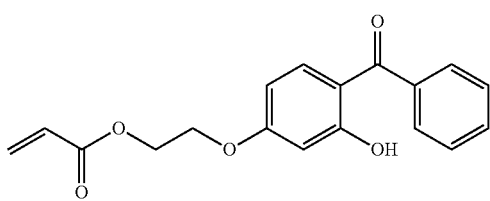

2-(4-benzoyl-3-hydroxyphenoxy)ethyl acrylate

For ophthalmic device forming monomer systems containing both slow reacting monomers such as NVP and fast reacting monomers, the use of benzotriazole UV blockers typically results in incomplete cure of the NVP and a subsequent loss of unreacted or partially oligomerized NVP during extraction. If one is seeking to make silicone hydrogel lenses containing benzotriazole UV blockers as well as PVP formed in situ, the incomplete cure of the NVP can result in not only the presence of unreacted or partially oligomerized NVP in the extractables but also lower water content of the fully hydrated polymerized device and compromised surface properties of the polymerized device (i.e. poorly wettable lenses). Therefore, it was surprising and unexpected to discover that in a method of making a substantially fully polymerized UV blocking hydrogel lens comprising polymerizing a monomer mixture of at least NVP and one other comonomer and a free-radical polymerizable, substituted or unsubstituted, Bis O-hydroxy benzophenone to provide a hydrogel ophthalmic device having a wettable surface and sufficient blocking of UV light to meet at least Class II specifications for UV blocking. FDA Class II blocker rated contact lenses are recommended by the American Optometric Association for general purposes use. These lenses must block more than 70% of UVA and 95% of UVB to be considered to be FDA Class II UV blockers. Preferred compositions for use in the method of the invention herein preferably have both hydrophilic and hydrophobic monomers. Depending upon the specific application, useful articles made according to the method of the invention herein may require organosilicon-containing hydrophobic monomers. These organosilicon-containing hydrophobic monomers can be present at between 0.1 to 75.8 percent by weight, more preferably between 2 to 20 percent by weight, even more preferably between 5 to 13 percent by weight. Amounts of non-organosilicon-containing hydrophobic monomers will be 0 to 60 percent by weight. Examples of non-organosilicon-containing hydrophobic materials include alkyl acrylates and methacrylates.

Depending upon the application, useful articles made according to the invention herein may also require bulky monomers such as those disclosed in U.S. Pat. No. 6,921,802 which include methacryloxypropyl tris(trimethylsiloxy)silane (TRIS), pentamethyldisiloxanyl methylmethacrylate, tris(trimethylsiloxy)methacryloxy propylsilane, phenyltretramethyl-disiloxanylethyl acrylate, methyl-di(trimethylsiloxy)methacryloxymethyl silane, 3-[tris(trimethylsiloxy)silyl]propyl vinyl carbamate, 31-tris(trimethylsiloxy)silyl] propyl allyl carbamate, and 3-[tris(trimethylsiloxy)silyl] propyl vinyl carbonate. These bulky monomers, when present, may be present at greater than 0 to 41.2 percent by weight, 34 to 41 percent by weight or even 25 to 41 percent by weight.

In general, organosilicon-containing hydrogels are prepared by polymerizing a mixture containing at least one silicone-containing monomer and at least one hydrophilic monomer. The organosilicon-containing monomer may function as a crosslinking agent (a crosslinker being defined as a monomer having multiple polymerizable functionalities) or a separate crosslinker may be employed. Hydrophobic crosslinkers would include methacrylates such as ethylene glycol dimethacrylate (EGDMA) and allyl methacrylate (AMA). Amounts of cross-linker used in the method of the invention herein can be between 0 to 76 percent by weight, 2 to 20 percent by weight or 5 to 13 percent by weight.

A wide variety of hydrophilic monomers may be used in the method of the invention herein. Suitable hydrophilic monomers include slow reacting monomers such as vinyl lactams such as NVP and 1-vinylazonan-2-one, as well as other slow reacting hydrophilic monomers such as O-vinyl carbonates, O-vinyl esters (e.g. vinylacetate), O-allyl esters, O-allyl carbonates, N-vinyl carbamates, O-vinyl carbamates, N-vinyl ureas, N-allyl carbamates, O-allyl carbamates and mixtures thereof. Depending upon the application, useful articles may also require, in addition to the slow reacting hydrophilic monomers, fast reacting hydrophilic monomers such as unsaturated carboxylic acids, methacrylic and acrylic acids; acrylic substituted alcohols, such as 2-hydroxyethyl methacrylate and 2-hydroxyethyl acrylate; and acrylamides, such as methacrylamide, N,N-dimethylacrylamide (DMA) and N-isopropylacrylamide (NIPAM).

The hydrophilic monomers will be present, separately or by combined weight in amounts of between 25 to 65 percent by weight, between 30 to 50 percent by weight, between 35 to 45 percent by weight.

The use of significant amounts of slow reacting silicone monomers in the method of the invention herein is cautioned against. Slow reacting silicone monomers would include, for example, vinyl carbonate and vinyl carbamate monomers as disclosed in U.S. Pat. Nos. 5,070,215 and 5,610,252 (Bambury et al).

An organic diluent may be included in the initial monomeric mixture. As used herein, the term "organic diluent" encompasses organic compounds which minimize incompatibility of the components in the initial monomeric mixture and are substantially nonreactive with the components in the initial mixture. Additionally, the organic diluent serves to minimize phase separation of polymerized products produced by polymerization of the monomeric mixture. Also, the organic diluent will generally be relatively non-inflammable.

Contemplated organic diluents include alcohols such as tert-butyl alcohol (TBA), tert-amyl alcohol, hexanol and nonanol; diols, such as ethylene glycol; and polyols, such as glycerol. Preferably, the organic diluent is sufficiently soluble in the extraction solvent to facilitate its removal from a cured article during the extraction step. Other suitable organic diluents would be apparent to a person of ordinary skill in the art.

The organic diluent is included in an amount effective to provide the desired effect (for example, minimal phase separation of polymerized products). Generally, the diluent is included at 0 to 60% by weight of the monomeric mixture, with 1 to 40% by weight being more preferred, 2 to 30% by weight being even more preferred and 3 to 25% by weight being especially preferred.

According to the present process, the monomeric mixture, comprising at least one slow reacting hydrophilic monomer, at least one ethylenically unsaturated hydrophobic monomer and optionally the organic diluent, is shaped and cured by conventional methods such as static casting or spin casting. The lens formation reaction mechanism can be free radical polymerization using initiators such as azobisisobutyronitrile (AIBN) and peroxide catalysts under conditions such as those set forth in U.S. Pat. No. 3,808,179, incorporated herein by reference. Photoinitiation of polymerization of the monomer mixture as is well known in the art may also be used in the process of forming an article as disclosed herein.

Colorants and the like may be added to the monomer mix prior to polymerization.

Subsequent to polymerization, organic diluent and extractables are removed from the cured article to improve the biocompatibility of the article. Release of non-polymerized monomers and oligomerized monomers into the eye upon installation of a lens can cause irritation and other problems. Therefore, once the biomaterials formed according to the method disclosed herein have been subjected to the polymerization step they are subsequently subjected to an extraction step to prepare them for packaging and eventual use. The extraction step is accomplished by exposing the polymerized materials to various solvents such as water, 2-propanol, etc. and mixes thereof for varying periods of time. For example, one extraction process is to immerse the polymerized materials in isopropyl alcohol for about an hour, remove the alcohol and then immerse the polymerized materials in an aliquot of water for about thirty minutes, remove that aliquot of water and then autoclave the polymerized material in water or buffer solution.

Following extraction of unreacted monomers and any organic diluent, the shaped article, for example an RGP lens, is optionally machined by various processes known in the art. The machining step includes lathe cutting a lens surface, lathe cutting a lens edge, buffing a lens edge or polishing a lens edge or surface. The present process is particularly advantageous for processes wherein a lens surface is lathe cut, since machining of a lens surface is especially difficult when the surface is tacky or rubbery.

Generally, such machining processes are performed before the article is released from a mold part. After the machining operation, the lens can be released from the mold part and hydrated. Alternately, the article can be machined after removal from the mold part and then hydrated.

The following examples are provided to enable one skilled in the art to practice the invention and are merely illustrative of the invention. The examples should not be read as limiting the scope of the invention as defined in the claims.

EXAMPLES

All solvents and reagents were obtained from commercially available sources as identified below and used as received.

| | |
|---|---|
| NVP-Distilled | Aldrich |
| CIX-4 | Novasep |
| DMA-Distilled | Aldrich |
| Irg 819 | Aldrich |
| Hexanol | Sigma Aldrich |
| Nonanol | Aldrich |
| SA Monomer | Aldrich |
| BTT | Aldrich |
| BPA-2 | Polysciences Inc |
| BPM-2 | Monomer-Polymer and Dajac Labs |
| BPA-1 | Aldrich |
| Reactive Blue Tint = IMVT | Arran |
| M1-EDS-6 | Gelest |
| Ma1D20 | Gelest |
| HEMA | Cyro Industries |

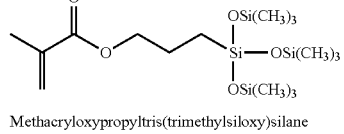

Methacryloxypropyltris(trimethylsiloxy)silane
TRIS

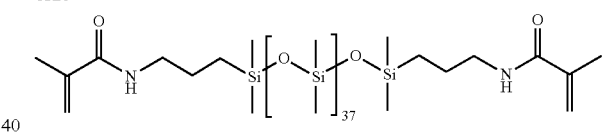

Ma2D37

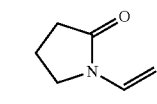

N-vinylpyrrolidone
NVP

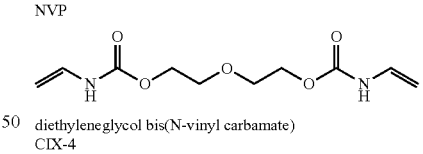

diethyleneglycol bis(N-vinyl carbamate)
CIX-4

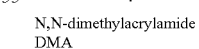

N,N-dimethylacrylamide
DMA

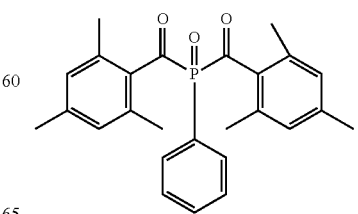

IRG 819 (photoinitiator)

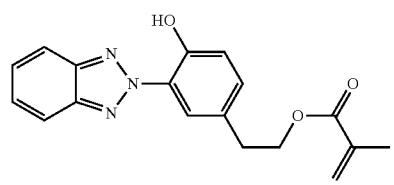

SA Monomer (UV Blocker)

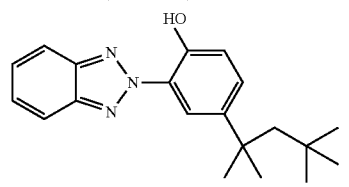

2-(2H-benzotriazol-2-yl)-4-(1,1,3,3-tetrabutyl) phenol
BTT

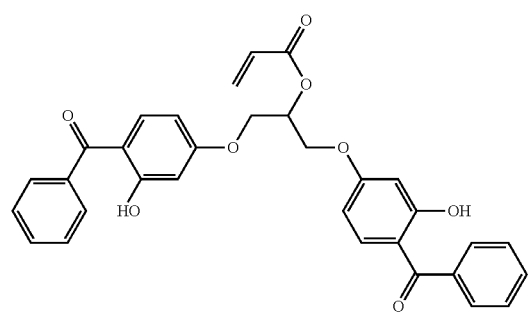

1,3-bis(4-benzoyl-3-hydroxyphenoxy)-2-propyl acrylate
BPA-2

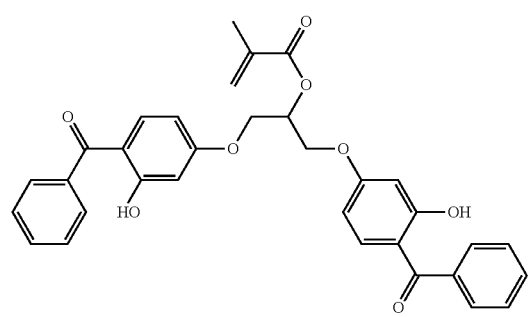

1,3-bis(4-benzoyl-3-hydroxyphenoxy)-2-propyl methacrylate
BPM-2

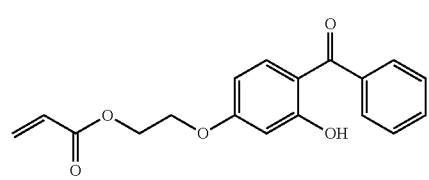

2-(4-benzoyl-3-hydroxyphenoxy)ethyl acrylate
BPA-1

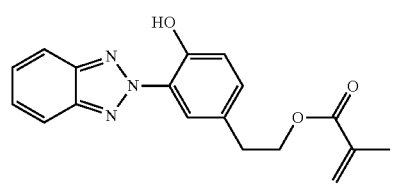 [SMILES: C=C(C)C(=O)OCCc1ccc(O)c(-n2nc3ccccc3n2)c1]

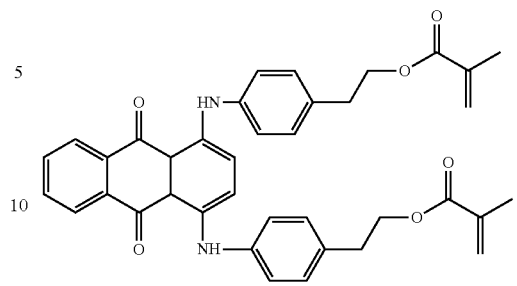

(((9,10-dioxo-4a,9,9a,10-tetrahydroanthracene-1,4-diyl)bis(azanediyl))bis(4,1-phenylene))bis(ethane-2,1-diyl)bis(2-methylacrylate)
IMVT

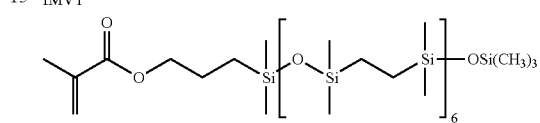

M1-EDS6 (EDS = ethylenedisiloxane)

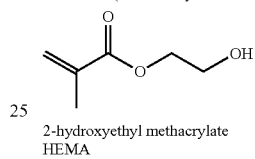

2-hydroxyethyl methacrylate
HEMA

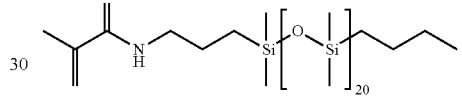

Ma1D20

Analytical Measurements and Methods

Unless specifically stated otherwise all analytical tests were conducted under standard laboratory bench top conditions; meaning, 21-23° C., 30-50% Relative Humidity and Atmospheric pressure.

Analysis to Determine FDA Class II UV Blockers

Three lenses are scanned on a Perkin Elmer Lambda 35 UV-Vis Spectrophotometer and the spectra is collected in transmission mode from 800 to 200 nm at a 1 nm data interval and a 2 nm spectral resolution. Blank/Background spectra is scanned with matching 10 mm pathlength quartz cuvettes in the Sample and Reference beams. Each cuvette contains Borate Buffered Saline and an empty 6 mm circular aperture lens holder. The spectra of the lenses are then collected after inserting the lens in the 6 mm aperture in the Sample beam.

Mechanical Properties

Modulus and elongation tests were conducted according to ASTM D-1708a, employing an Instron (Model 4502) instrument where the hydrogel film sample is immersed in BBS (isotonic physiologic Borate Buffered Saline, pH 6.8-7.2, Osmolality 270-320); an appropriate size of the film sample is gauge length 22 mm and width 4.75 mm, where the sample further has ends forming a dog bone shape as shown in FIG. 2A to accommodate gripping of the sample with clamps of the Instron instrument, and a thickness of 200±50 microns.

Method for Determining the Tear Strength of Spherical Hydrogel Contact Lenses

Preparation of Samples

1. Remove the first lens from the packaging and place it anterior side down on the cutting block.

2. Gently wipe any excess fluid off the surface at one edge.

3. Tape the front and back sides of that edge with Teflon tape as represented in FIG. 1A and cut the tape down to a rectangle.

4. Once taped, place the specimen in a Petri dish filled with BBS to rehydrate.

Test Procedure

1. Lower the saline tank on the Instron 4502 equipped with same.
2. Take the specimen out of the saline and cut through the tape approximately 1 mm into the lens beyond the tape to initiate the tear as represented in FIG. 1B.
3. Mount one side into the upper clamp and the other side into the lower clamp as represented in FIG. 2B so that the initiated tear is held in tension.
4. Raise the saline tank around the specimen.
5. Allow the specimen to hydrate for at least 30 seconds before starting the test
NOTE: Once the specimen is mounted make sure that the load does not read more than 0.1 g. If it is greater than 0.1 g, remove the specimen and rebalance the load until 0.000 g±0.002 is reached. Then replace the specimen in the grips and raise the tank.
6. Using the software control, enter in the specimen thickness and begin the test.
7. Once the first specimen has completed the tear, review the load displacement plot and data to determine if the data should be kept (filed) or rejected. Any gross failures, such as discontinuities in the plot should be rejected. If the first displacement marker is to the left of the first peak in load, then move it to the first peak in load. Repeat for the remaining specimens for the sample batch.
8. Once all the specimens from one lot are tested print a copy of the results.

Data Recording

Report the average tear strength and the standard deviation. Note on the request and raw data sheet that the data was calculated using the average thickness at a 6 mm diameter (or at center thickness if the anterior and posterior radii could not be obtained).

Required Materials and Equipment

Description—This testing procedure describes the materials and procedure used to determine the modulus of spherical hydrogel contact lenses.

1. An Instron model 4502 mechanical tester coupled with a 250 g load cell installed on the stationary crosshead.
2. A saline tank fixed to the Instron to keep the specimen hydrated during testing.
3. Test Works data acquisition package and data station (computer and printer).
4. A set of 10 lenses (at minimum) for testing.
5. A pair of Teflon tweezers for handling the contact lenses.
6. A wood cutting block.
7. A hammer.
8. A die to cut the tensile specimens from the contact lens. Must cut specimens to the dimensions shown in FIG. 2A.
9. Teflon Tape.
10. A pair of scissors.
11. A Petri dish filled with BBS.

Instrument Setup

1. Using the anterior and posterior radii given for the lot tested, convert the center thickness submitted to the average thickness at a 6 mm diameter. Use the average thickness for the lens dimensions.
2. Set the Instron grips to be separated to accommodate a 6 mm gauge length sample.
3. Raise the saline tank around the grips so that the grips can equilibrate for 10 to 15 minutes prior to use.
4. Calibrate the instrument so that the load display reads 0.000±0.002 g. NOTE: Use a 6.35 mm/min crosshead speed.
5. Select method number 10 so that the modulus is calculated between loads of 0.25 g and 2 g.

Preparation of Samples

1. Remove the first lens from the packaging and place it anterior side down on the cutting block.
2. Cut a tensile specimen by centering a die designed to prepare a shape as shown in FIG. 2A on the posterior surface of the lens and hammering the back side of the die once.
3. Remove the tensile specimen from the die and tape the front and back side of each edge as represented in FIG. 2B.
4. Cut the tape down to a rectangle.
5. Once taped, place the specimen in a Petri dish filled with BBS to rehydrate.

Test Procedure

1. Lower the saline tank on the Instron 4502.
2. Take the specimen out of the saline and mount one edge into the upper clamp and the other into the lower clamp as shown in FIG. 2B so that the specimen is taut and straight.
3. Raise the saline tank around the specimen.
4. Allow the specimen to hydrate for at least 30 seconds before starting the test. NOTE: Once the specimen is mounted make sure that the load does not read more than 0.100 g. If it is greater than 0.100 g, remove the specimen and rebalance the load until 0.000 g±0.002 is reached. Then replace the specimen in the grips and raise the tank.
5. Using the software control, enter the specimen thickness and begin the test.
6. Once the first specimen has broken, review the load displacement plot and data to determine if the data should be kept (filed) or rejected. Any gross failures, such as discontinuities in the plot should be rejected. Enlarge the modulus slope region to determine if the tangent was drawn correctly. Repeat for the remaining specimens for the sample lot.
7. Once all the specimens from one lot are tested print a copy of the results.

Data Recording

Report the average modulus and the standard deviation. Note on the request and raw data sheet that the data was calculated using the average thickness at a 6 mm diameter (or at center thickness if the anterior and posterior radii could not be obtained).

Contact Angle Measurements Performed by Captive Bubble

In the captive bubble technique, a substrate is immersed in a test fluid and a gas bubble or immiscible liquid (e.g. octane) is brought into contact with the surface. The contact angle in the liquid phase is reported. The magnitude of the contact angle depends on the degree to which the gas bubble displaces liquid on the already wet (conditioned) test surface. Advancing and receding contact angle in the captive bubble mode can also be measured. However, by convention, as angles in the liquid phase are reported, the receding contact angle corresponds to the case where the gas bubble is expanded (or advanced). Similarly, the advancing contact angle corresponds to the case when the gas bubble is contracted causing the liquid phase to advance.

Figure 4:
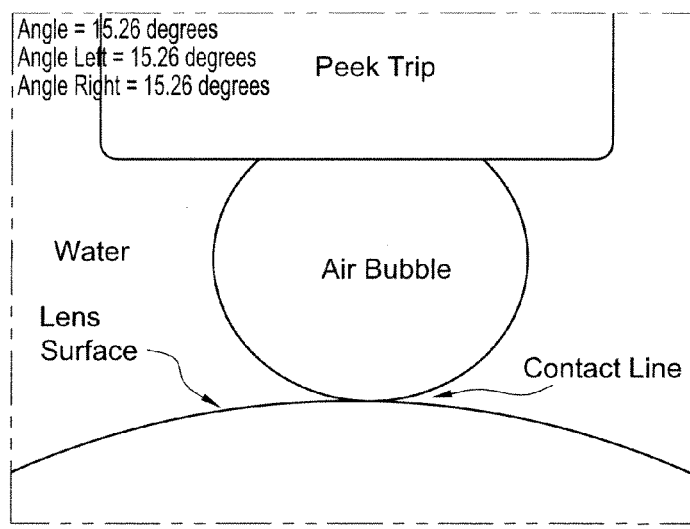
FIG. 4 is a photograph of Typical Bubble Geometry For Captive Bubble Contact Angle Measurement Using the Nozzle to Capture the Bubble.

All measurements were made using the FTA1000C apparatus purchased from First Ten Angstroms. A specially designed holder was used to secure the contact lens. Captive bubble experiments may be performed either by using the contact lens to capture the air bubble, as shown in FIG. 3, or using the nozzle tip to capture the bubble as seen in FIG. 4. We prefer to use the later configuration as it proved easier to capture the air bubble than in the upside down configuration.

A standard operating procedure was developed for loading the lens and for determining advancing and receding contact angles using the captive bubble technique. Each lens to be tested was removed from its blister packs using clean tweezers while wearing clean, silicon free, latex gloves. Each lens was placed in a previously unused clean polystyrene Petri dish and soaked for five minutes in double distilled water with the anterior side facing up. The lens was then grasped gently at the edge and actively rinsed by moving back and forth in the water for an additional minute. After rinsing the lens was mounted anterior side facing up in a curved holder specifically designed for contact lens measurements. The holder was placed in a glass cell previously filled with double distilled water and the cell was placed in the instrument for contact angle measurement.

The instrument was primed with fresh double distilled water every day before use. The sample holder and glass cell were also rinsed with fresh double distilled water each day before beginning measurements and when changing between lens families (e.g. AcuVue Oasys to PureVision). All sample positioning was done under computer control using the FTA software interface. The sample surface and the syringe tip were imaged using a high speed CCD camera backlight with a high brightness LCD panel and displayed on the computer screen. A 16 micro liter air bubble was pushed out of the syringe and trapped between the 4.8 mm diameter PEEK needle tip with an approximately 1 mm opening and the sample surface as shown in FIG. 3. The sample stage position was adjusted in the x and y travel direction so that bubble was centered at the apex of the sample surface. The needle was adjusted in the z direction such that a 16 micro liter bubble would contact the sample surface but not significantly distort the bubble shape. Contact angles were always measured relative to the denser medium. The receding angle was, therefore, measured by pumping air into the bubble and expanding it at 1 micro liter/sec until the contact line between the air bubble and the lens surface began to grow longer as the lens began to de-wet. The angle between the bubble and the lens surface was measured at that point.

The advancing angle was measured by pumping air out of the bubble and shrinking it at 1 micro liter/sec until the contact line between the air bubble and the lens surface unpinned and began to shrink as the lens surface re-wet. The angle between the bubble and the lens was measured at that point. All angles were measured by drawing intersecting tangent lines on the bubble and the lens surface near the contact point and recording the angle between them. This operation was performed on both sides of the bubble for both advancing and receding angles. The average angles and hysteresis, the difference between advancing and receding angles, were computed.

Captive Bubble testing is performed using the First Ten Angstroms (Model FTA Series 1000); equipped with a 50 mm USB high speed camera with image capture capability. Ensure that Interfacial Tension of water test has been performed and has met acceptable criteria prior to performing Captive Bubble testing.

Lenses in BBS Packaging Solution Protocol

Prepare lenses in lots of three each which are transferred with tweezers from individual packaging into Petri dishes filled to mark with 18 Meg water. Latex gloves are to be worn during the duration of sample preparation and Captive Bubble testing. Note: BBS samples are to soak for a minimum of 15 minutes prior to testing.

Analysis of First Lens Sample

After the lens samples pretreatment use tweezers to mount one lens sample on the lens nickel mounting tool, then position the tool into the tool holding fixture. Position the fixture into a glass cuvette filled to mark with 18 Meg water. Position the fixture onto the FTA 1000 stage. In MENU select Z Stage±, move by +21.00 polarity (moves bottom stage/lens/fixture into proper position). In Menu select Tip Z±, move by −18.00 polarity (moves needle tip into proper position). Menu: select DISPENSE. If the bubble is not observed at this time, manually PUMP OUT until the bubble first appears. Press START. The bubble will begin to increase in size until it is only a short distance from the lens surface, then automatically stop (Note if it appears that the bubble is going to touch the lens surface immediately press STOP. Enter 0.03 in the polarity value box, then press move by—until the bubble almost comes in contact with the lens surface. Select Y stage Z±, move by ±, 0.250 to set the white reflection lines to the point of bubble attachment. Enter 0.03 in the polarity value box again, then press move by—until the bubble first comes in contact with the lens surface. Wait a second or two to see if the point of contact appears to spread horizontally. If not, press move by—once again. Press RUN (starts movie event), wait for an audible beep sound, press PUMP OUT, wait 1 to 2 seconds, then press PUMP IN.

At the moment the bubble detaches from the lens surface press ABORT (Pressing ABORT ends the movie event). Save the movie as a file in a folder in E\: FTA in the Captive Bubble folder, i.e. New Folder: 11-XXX. Create a movie file: 01-1, 2,3 for each lens from the same lot. Press PUMP IN to shrink the size of the bubble to its original size at dispense. Menu: Tip Z±, move by +0.03 3 to 5 times then enter +18.00 to raise the needle tip up to its proper height for the next sample. Menu: Z Stage±, move by −21.00 to lower bottom stage/lens/fixture into proper position for the next sample. Remove the fixture/Lens sample/cuvette from the stage. Remove the fixture from the cuvette. Remove the lens holder from the fixture and discard. Using tweezers, obtain the next lens sample to be tested. Use fresh 18 Meg water to rinse and fill the cuvette between each lot. End of the day: deselect VIDEO to turn off. Rinse the cuvette, lens holder, allow to air dry and store under foil. Use Y Stage±move by − or +0.250 to adjust the stage white lines used for alignment with the bubble contacting the lens surface. Use X Stage±move by − or +0.10 or other value to adjust both sides of the stage at approximately the same height.

Wilhelmy Plate Wettability Measurement—Determination of Hysteresis Loop Area

Wilhelmy plate hysteresis loop measurements were all carried out in a Kruss Processor Tensiometer Model K100MK2.

Procedure

Sample lenses to be tested were rinsed in BBS overnight to remove any remnants of packaging solution components. Once rinsed, samples were removed from the solution and placed in fresh BBS for at least 15 minutes. The Pt anchor (used to weigh down samples) was flamed with a propane torch to remove all surface contamination. All lenses were cut into strips using a sharp blade to the following dimension: 10 mm long×3.3 mm wide. Attach Pt anchor to the sample strip within 1 mm of the bottom. Attach the top half of the lens strip to the sample clip in the instrument, and place into the electro-balance holder. Fill dip tank with fresh BBS. Lower cut lens sample and anchor into the fresh BBS such that the bottom of the lens is approximately 1 mm above the BBS solution. Set the dipping speed to run and 6 mm/min and the total distance traveled to 9.5 mm. Discard the results from the first dipping cycle as the lens is re-hydrating after sample preparation. Perform three additional dipping cycles. Plot the force exerted on the sample as a function of distance traveled for the three cycles and average the results. Integrate the area bound by the curve for the average force plot and report this value as the hysteresis loop area.

Determination of equilibrium water content (% WC)

$$\left( \frac{\text{(Wet weight (mg)} - \text{Dry weight (mg))}}{\text{Wet weight (mg)}} \right) \times 100$$

TABLE I

Comparative Examples

| | | TRIS | Ma2D37 | NVP | CIX-4 | DMA | Irg 819 | Hexanol | Nonanol | SA Monomer |
|---|---|---|---|---|---|---|---|---|---|---|
| Comparative Example 1 | wt % | 34.1 | 7.48 | 36.3 | 0.25 | 4.98 | 0.33 | 16.6 | * | 0 |
| Comparative Example 2 | wt % | 33.9 | 7.44 | 36.1 | 0.25 | 4.96 | 0.33 | 16.5 | * | 0.41 |
| Comparative Example 3 | wt % | 33.8 | 7.41 | 36 | 0.25 | 4.94 | 0.33 | 16.5 | * | 0.82 |
| Comparative Example 4 | wt % | 33.6 | 7.38 | 35.8 | 0.25 | 4.92 | 0.33 | 16.4 | * | 1.23 |
| Comparative Example 5 | wt % | 33.5 | 7.35 | 35.7 | 0.25 | 4.9 | 0.33 | 16.3 | * | 1.63 |
| Comparative Example 6 | wt % | 33.7 | 7.43 | 35.9 | 0.248 | 4.99 | 0.337 | 17.3 | * | * |
| Comparative Example 7 | wt % | 33.5 | 7.37 | 35.6 | 0.246 | 4.95 | 0.334 | 17.2 | * | 0.852 |
| Comparative Example 8 | wt % | 33.5 | 7.37 | 35.6 | 0.246 | 4.95 | 0.334 | 17.2 | * | * |
| Comparative Example 9 | wt % | 34.8 | 7.05 | 30.8 | * | 4.74 | 0.47 | * | 4.74 | * |
| Comparative Example 10 | wt % | 34.6 | 7.02 | 30.7 | * | 4.72 | 0.468 | * | 4.72 | 0.7 |
| Comparative Example 11 | wt % | 34.7 | 7.02 | 30.9 | * | 4.74 | 0.471 | * | 4.71 | * |
| Comparative Example 12 | wt % | 34.5 | 6.98 | 30.5 | * | 4.7 | 0.466 | * | 4.7 | * |
| Comparative Example 13 | wt % | 34.2 | 6.92 | 30.2 | * | 4.65 | 0.461 | * | 4.65 | * |

| | 2-(2H-Benzotriazol-2-BTT | BPA-2 | BPM-2 | BPA-1 | Reactive Blue Tint | M1-EDS-6 | HEMA |
|---|---|---|---|---|---|---|---|
| Comparative Example 1 | * | * | * | * | * | * | * |
| Comparative Example 2 | * | * | * | * | * | * | * |
| Comparative Example 3 | * | * | * | * | * | * | * |
| Comparative Example 4 | * | * | * | * | * | * | * |
| Comparative Example 5 | * | * | * | * | * | * | * |
| Comparative Example 6 | * | * | * | * | 0.023 | * | * |
| Comparative Example 7 | * | * | * | * | 0.023 | * | * |
| Comparative Example 8 | 0.806 | * | * | * | 0.023 | * | * |
| Comparative Example 9 | * | * | * | * | 0.02 | 12.7 | 4.74 |
| Comparative Example 10 | * | * | * | * | 0.02 | 12.6 | 4.72 |
| Comparative Example 11 | * | * | * | * | 0.02 | 12.6 | 4.87 |
| Comparative Example 12 | * | * | * | 0.933 | 0.02 | 12.5 | 4.7 |
| Comparative Example 13 | * | * | * | 1.84 | 0.02 | 12.4 | 4.65 |

*Material not included in Comparative Example/Example

TABLE 2

Examples

| | Measurement Type | TRIS | Ma2D37 | NVP | CIX-4 | DMA | Irg 819 | Hexanol | Nonanol | SA Monomer |
|---|---|---|---|---|---|---|---|---|---|---|
| Example 1 | wt % | 34.6 | 7.02 | 30.7 | * | 4.72 | 0.468 | * | 4.72 | * |
| Example 2 | wt % | 34.5 | 6.98 | 30.51 | * | 4.695 | 0.466 | * | 4.695 | * |
| Example 3 | wt % | 34.3 | 6.95 | 30.4 | * | 4.67 | 0.463 | * | 4.67 | * |
| Example 4 | wt % | 34.1 | 6.92 | 30.2 | * | 4.65 | 0.461 | * | 4.65 | * |
| Example 5 | wt % | 34.4 | 6.96 | 30.6 | * | 4.7 | 0.466 | * | 4.67 | * |

TABLE 2-continued

Examples

|  |  |  |  |  |  |  |  |  |  |
|---|---|---|---|---|---|---|---|---|---|
| Example 6 | wt % | 34.5 | 6.98 | 30.5 | * | 4.7 | 0.466 | * | 4.7 | * |
| Example 7 | wt % | 34.5 | 6.98 | 30.5 | * | 4.7 | 0.466 | * | 4.7 | * |
| Example 8 | wt % | 34.9 | 7.05 | 30.8 | * | 4.7 | 0.47 | * | 4.7 | * |
| Example 9 | wt % | 34.1 | 6.92 | 30.2 | * | 4.7 | 0.46 | * | 4.7 | * |
| Example 10 | wt % | 34.4 | 7.00 | 30.4 | * | 4.9 | 0.47 | * | 4.6 | * |

|  | BTT | BPA-2 | BPM-2 | BPA-1 | Reactive Blue Tint | M1-EDS-6 | HEMA |
|---|---|---|---|---|---|---|---|
| Example 1 | * | 0.47 | * | * | 0.02 | 12.6 | 4.72 |
| Example 2 | * | 0.94 | * | * | 0.02 | 12.541 | 4.695 |
| Example 3 | * | 1.4 | * | * | 0.02 | 12.5 | 4.67 |
| Example 4 | * | 1.87 | * | * | 0.02 | 12.4 | 4.65 |
| Example 5 | * | * | 0.939 | * | 0.02 | 12.5 | 4.83 |
| Example 6 | * | * | 1.864 | * | 0.02 | 12.5 | 4.7 |
| Example 7 | * | 0.94 | * | * | 0.02 | 12.5 | 4.7 |
| Example 8 | * | * | * | * | 0.02 | 12.66 | 4.74 |
| Example 9 | • | 1.86 | * | * | 0.02 | 12.42 | 4.65 |
| Example 10 | * | * | 0.93 | * | 0.02 | 12.51 | 4.81 |

*Material not included in Comparative Example/Example

TABLE 3

| Sample ID | Blocker | Blocker parts Wt % | Modulus | Tensile | % Elongation | Tear | UV Class | % cure | % WC | WP Area Loop | Contact Angle Rec | Adv | Hyst |
|---|---|---|---|---|---|---|---|---|---|---|---|---|---|
| Comparative Example 9 | None | 0 | 74 (3) | 65 (33) | 150 (76) | 5 | None | 100 | 45.1 | 1.44 | 20 (0.3) | 32 (3.2) | 13 (3.3) |
| Comparative Example 10 | SA monomer | 0.7 | 90 (7) | 57 (33) | 111 (75) | 6 | II | 100 | 43.1 | 2.11 | 20 (0.3) | 33 (1.4) | 13 (1.4) |
| Comparative Example 12 | BPA-1 | 1 | 64 (5) | 38 (25) | 97 (68) | 5 | II | 100 | 47.8 | 1.56 | 21 (1.0) | 61 (27.5) | 40 (28.4) |
| Comparative Example 13 | BPA-1 | 2 | 37 (6) | 38 (23) | 170 (100) | 6 | II | 99.3 | 44.1 | 2.01 | 21 (1.2) | 108 (5.2) | 87 (4.9) |
| Example 7 | BPA-2 | 1 | 75 (6) | 89 (21) | 205 (43) | 6 | II | 100 | 43.9 | 1.83 | 21 (0.6) | 31 (1.0) | 11 (1.2) |
| Example 4 | BPA-2 | 2 | 76 (5) | 77 (29) | 169 (56) | 6 | II | 100 | 45.1 | 1.43 | 21 (1.3) | 33 (3.3) | 12 (4.6) |
| Example 8 | None | 0 | 63 (5) | 57 (12) | 155 (34) |  | None |  | 44.9 | 0.67 | 20 (0.8) | 32 (0.7) | 12 (0.4) |
| Example 9 | BPA-2 | 2 | 70 (3) | 75 (22) | 191 (55) |  | II |  | 44.2 | 0.91 | 21 (0.9) | 33 (0.5) | 11 (1.3) |
| Example 10 | BPM-2 | 1 | 86 (5) | 93 (13) | 198 (32) |  | II |  | 42.3 | 0.96 | 21 (0.4) | 29 (1.9) | 9 (2.1) |

TABLE 4

|  | Example 11 | Example 12 | Example 13 | Example 14 |
|---|---|---|---|---|
| Formulation |  |  |  |  |
| TRIS | 33.00 | 33.15 | 33.50 | 33.64 |
| Ma2D37 | 5.75 | 5.78 | 3.63 | 3.65 |
| Ma1D20 | 1.64 | 1.65 | 3.68 | 3.70 |
| NVP | 35.95 | 36.11 | 35.68 | 35.84 |
| CIX-4 | 0.25 | 0.25 | 0.25 | 0.25 |
| DMA | 4.95 | 4.98 | 4.92 | 4.94 |
| Irg 819 | 0.33 | 0.33 | 0.33 | 0.33 |
| Hexanol | 16.48 | 16.55 | 16.35 | 16.42 |
| Tint [Reactive Blue?] | 0.02 | 0.02 | 0.02 | 0.02 |
| BPA-2 | 1.64 |  | 1.65 |  |
| BPM2 |  | 1.21 |  | 1.23 |
| Properties |  |  |  |  |
| Modulus (g/mm2) | 103 (8) | 110 (6) | 81 (4) | 72 (5) |
| Tensile Strength (g/mm2) | 160 (11) | 132 (32) | 98 (46) | 66 (16) |
| % Elongation (%) | 220 (8) | 179 (31) | 189 (72) | 141 (35) |
| Tear Strength (g/mm) | 8 (1) | 8 (1) | 8 (1) | 8 (0.2) |
| Water Content (%) | 55.1 (0.1) | 55.1 (0.1) | 58.9 (0.1) | 59.1 (0.1) |
| Contact Angle Adv. | 37 (0.3) | 37 (0.4) | 37 (0.8) | 37 (0.4) |
| UVB Class | II | II | II | II |

TABLE 5

| Sample ID | Contact Angle Rec | Adv | Hyst | % WC |
|---|---|---|---|---|
| Comparative Example 1 | 21 (0.3) | 30 (0.2) | 9 (0.4) | 51.5 (0.4) |
| Comparative Example 2 | 21 (0.4) | 30 (1.0) | 9 (1.0) | 51.0 (0.5) |
| Comparative Example 3 | 20 (0.7) | 31 (0.9) | 10 (1.5) | 47.6 (0.4) |

TABLE 5-continued

| | Contact Angle | | | |
|---|---|---|---|---|
| Sample ID | Rec | Adv | Hyst | % WC |
| Comparative Example 4 | 21 (0.8) | 81 (2.3) | 60 (1.7) | 40.3 (0.7) |
| Comparative Example 5 | 21 (0.8) | 84 (2.3) | 63 (2.1) | 37.0 (0.3) |

TABLE 6

| | Blocker | Blocker (%) | Mod. | Tear | WC (%) | WP Area Loop | UV Class | Contact Angle | | |
|---|---|---|---|---|---|---|---|---|---|---|
| | | | | | | | | Rec. | Adv. | Hyst. |
| Comparative Example 9 | None | 0 | 74 | 5 | 45.1 | 1.44 | None | 20 (0.3) | 32 (3.2) | 13 (3.3) |
| Comparative Example 10 | SA Monomer | 0.7 | 90 | 6 | 43.1 | 2.11 | II | 20 (0.3) | 33 (1.4) | 13 (1.4) |
| Example 4 | BPA-2 | 2.0 | 76 | 6 | 45.1 | 1.43 | II | 21 (1.3) | 33 (3.3) | 12 (4.6) |

Results

As shown by the water content data in Tables 3 and 5, the use of benzotriazole blockers (SA monomer) in monomer systems results in incomplete cure of NVP with subsequent loss of unreacted or partially oligomerized NVP during extractions. Additionally, in the presence of SA monomer many lenses in a given lot will exhibit very large advancing contact angles and increased variability of the contact angle. This variability is not observed when the SA monomer UV blocker is removed from the formulation.

Preferred Embodiments

1(a). A method of making a substantially fully polymerized UV blocking hydrogel lens comprising:
  polymerizing a monomer mixture of at least NVP and one other comonomer and a free-radical polymerizable Bis o-hydroxy benzophenone to provide a hydrogel ophthalmic device having a wettable surface.

1(b). A method of making a substantially fully polymerized UV blocking hydrogel lens comprising:
  polymerizing a monomer mixture of at least NVP and one other comonomer and a free-radical polymerizable Bis o-hydroxy benzophenone to provide a hydrogel ophthalmic device having sufficient blocking of UV light to meet at least Class II specifications for UV blocking.

1(c) A method of making a substantially fully polymerized UV blocking hydrogel lens comprising:
  polymerizing a monomer mixture of at least one monomer selected from the group consisting of NVP, O-vinyl carbonates such as 2-hydroxyethyl vinyl carbonate, O-vinyl esters such as vinylacetate, O-allyl esters such as allyl acetate, O-allyl carbonates such as allyl (2-(dimethylamino)ethyl)carbonate, N-vinyl carbamates such as 2-methoxyethyl vinylcarbamate, O-vinyl carbamates such as Vinal acid also known as 3-(((vinyloxy)carbonyl)amino)propanoic acid, N-vinyl ureas such as 1-(2-hydroxyethyl)-3-vinylurea and 1-allyl-3-(2-hydroxyethyl)urea, carbamates such as 2-hydroxyethyl allylcarbamate, O-allyl carbamates such as allyl (2-hydroxyethyl)carbamate and mixtures thereof and at least one other comonomer and a free-radical polymerizable Bis o-hydroxy benzophenone to provide a hydrogel ophthalmic device having a wettable surface and sufficient blocking of UV light to meet at least Class II specifications for UV blocking 1(d) A method of making a substantially fully polymerized UV blocking hydrogel lens comprising:
  polymerizing a monomer mixture of at least one monomer selected from the group consisting of NVP, O-vinyl carbonates such as 2-hydroxyethyl vinyl carbonate, O-vinyl esters such as vinylacetate, O-allyl esters such as allyl acetate, O-allyl carbonates such as allyl (2-(dimethylamino)ethyl)carbonate, N-vinyl carbamates such as 2-methoxyethyl vinylcarbamate, O-vinyl carbamates such as Vinal acid also known as 3-(((vinyloxy)carbonyl)amino)propanoic acid, N-vinyl ureas such as 1-(2-hydroxyethyl)-3-vinylurea and 1-allyl-3-(2-hydroxyethyl)urea, N-allyl carbamates such as 2-hydroxyethyl allylcarbamate, O-allyl carbamates such as allyl (2-hydroxyethyl)carbamate and mixtures thereof and at least one other comonomer and a free-radical polymerizable Bis o-hydroxy benzophenone to provide a hydrogel ophthalmic device having a wettable surface and sufficient blocking of UV light to meet at least Class II specifications for UV blocking 2. The method of embodiments 1(a-d), alone or in any combination in full or portion thereof, further comprising:
  reacting the monomer mixture under conditions suitable to cause substantially fully co-cure of the monomer system component of the reaction mixture to provide a substantially fully copolymerized UV blocker containing ophthalmic device.

3. The method of one or more of embodiments 1(a-d), alone or in any combination in full or portion thereof, wherein the Bis o-hydroxy benzophenone is a substituted Bis o-hydroxy benzophenone selected from the group consisting of 1,3-Bis(4-benzoyl-3-hydroxyphenoxy)-2-propyl acrylate and 1,3-Bis(4-benzoyl-3-hydroxyphenoxy)-2-propyl methacrylate and mixtures thereof.

4. The method of embodiment 2, wherein the substantially fully copolymerized UV blocker containing ophthalmic device has an equilibrium water content of about 42.3% to about 59.1% at equilibrium when fully hydrated.

5. The method of embodiment 2, wherein the substantially fully copolymerized UV blocker containing ophthalmic device has a receding contact angle of about 21 as determined by the method of Contact Angle Measurements Performed by Captive Bubble as described herein.

6. The method of embodiment 2, wherein the substantially fully copolymerized UV blocker containing ophthalmic device has an advancing contact angle of between about 29 and about 33 as determined by the method of Contact Angle Measurements Performed by Captive Bubble as described herein.

7. A UV blocking contact lens containing entrained PVP and having an equilibrium water content of about 42.3% to about 59.1% when fully hydrated.

8. The UV blocking contact lens of embodiment 7 having a receding contact angle of about 21 as determined by the method of Contact Angle Measurements Performed by Captive Bubble as described herein.

9. The UV blocking contact lens of embodiment 7 having a advancing contact angle of between about 29 and about 33 as determined by the method of Contact Angle Measurements Performed by Captive Bubble as described herein.

10. A UV blocking silicone hydrogel contact lens containing entrained PVP and having a having an equilibrium water content of about 42.3% to about 59.1% when fully hydrated.

11. The UV blocking silicone hydrogel contact lens of embodiment 10 and having a receding contact angle of about 21.

12. The UV blocking silicone hydrogel contact lens of embodiment 10 and having a advancing contact angle of between about 29 and about 33.

13. The method of one or more of embodiments 1(a-d), alone or in any combination in full or portion thereof, wherein the Bis o-hydroxy benzophenone is functionalized with a free-radical polymerizable mono acrylate group or free-radical polymerizable mono methacrylate group.

14. The method of one or more of embodiments 1(a-d), alone or in any combination in full or portion thereof, wherein the substantially fully copolymerized UV blocker containing ophthalmic device has a Wilhelmy Plate area loop of between 0.91 and 1.83.

15. The method of one or more of embodiments 1(a-d), alone or in any combination in full or portion thereof, wherein the monomer mixture further comprises an organosilicon-containing hydrophobic monomer.

16. The method of embodiment 15 wherein the organosilicon-containing monomer is present at between 0.1 to 75.8 percent by weight.

17. The method of embodiment 15 wherein the organosilicon-containing monomer is present at between 2 to 20 percent by weight.

18. The method of embodiment 15 wherein the organosilicon-containing monomer is present at between 5 to 13 percent by weight.

19. The method of embodiment 15 wherein the monomer mixture further comprises non-organosilicon-containing hydrophobic monomers.

20. The method of embodiment 19 wherein the non-organosilicon-containing hydrophobic monomers are present at about 0 to 60 percent by weight.

21. The method of embodiment 19 wherein the non-organosilicon-containing hydrophobic monomers are selected from the group consisting of alkyl acrylates and alkyl methacrylates.

22. The method of embodiment 15 wherein the monomer mixture further comprises a bulky monomer selected from the group consisting of methacryloxypropyl tris(trimethylsiloxy) silane (TRIS), pentamethyldisiloxanyl methylmethacrylate, tris(trimethylsiloxy)methacryloxy propylsilane, phenyltretramethyl-disiloxanylethyl acrylate, methyl-di(trimethylsiloxy)methacryloxymethyl silane, 3-[tris(trimethylsiloxy)silyl]propyl vinyl carbamate, 31-tris(trimethylsiloxy)silyl] propyl allyl carbamate, and 3-[tris(trimethylsiloxy)silyl] propyl vinyl carbonate, and mixtures thereof.

23. The method of embodiment 22 wherein the bulky monomer is present at greater than 0 to 41.2 percent by weight.

24. The method of embodiment 22 wherein the bulky monomer is present at greater than 34 to 41 percent by weight.

25. The method of embodiment 22 wherein the bulky monomer is present at greater than 25 to 41 percent by weight.

26. The method of embodiment 15 wherein the monomer mixture further comprises a hydrophobic crosslinker selected from the group consisting of ethylene glycol dimethacrylate (EGDMA), allyl methacrylate (AMA) and mixtures thereof.

27. The method of embodiment 26 wherein the hydrophobic crosslinker is present at between 0 to 76 percent by weight.

28. The method of embodiment 26 wherein the hydrophobic crosslinker is present at between 2 to 20 percent by weight.

29. The method of embodiment 26 wherein the hydrophobic crosslinker is present at between 5 to 13 percent by weight.

30. The method of embodiment 15 wherein the monomer mixture further comprises a slow reacting hydrophilic monomer in addition to NVP.

31. The method of embodiment 30 wherein the slow reacting hydrophilic monomer is 1-vinylazonan-2-one.

32. The method of embodiment 15 wherein the monomer mixture further comprises a fast reacting hydrophilic monomer.

33. The method of embodiment 32 wherein the fast reacting hydrophilic monomer is selected from the group consisting of unsaturated carboxylic acid containing monomers, acrylic substituted alcohol containing monomers, acrylamide containing monomers and mixtures thereof.

34. The method of embodiment 32 wherein the fast reacting hydrophilic monomer is selected from the group consisting of methacrylic acid, acrylic acid, 2-hydroxyethyl methacrylate, 2-hydroxyethyl acrylate, methacrylamide, N,N-dimethylacrylamide (DMA), N-isopropylacrylamide (NIPAM) and mixtures thereof.

35. The method of embodiment 32 wherein the fast reacting hydrophilic monomer is present at between 25 to 60 percent by weight.

36. The method of embodiment 32 wherein the fast reacting hydrophilic monomer is present at between 30 to 50 percent by weight.

37. The method of embodiment 32 wherein the fast reacting hydrophilic monomer is present at between 35 to 45 percent by weight.

38. The method of embodiment 30 wherein the slow reacting hydrophilic monomer is present at between 25 to 65 percent by weight.

39. The method of embodiment 30 wherein the slow reacting hydrophilic monomer is present at between 30 to 55 percent by weight.

40. The method of embodiment 30 wherein the slow reacting hydrophilic monomer is present at between 35 to 45 percent by weight.

41. The method of one or more of embodiments 1(a-d), alone or in any combination in full or portion thereof, wherein the monomeric mixture further comprises at least one slow reacting hydrophilic monomer, at least one ethylenically unsaturated hydrophobic monomer and an organic diluent and comprising the combined step of shaping and polymerizing the substantially fully polymerized UV blocking hydrogel lens by a method selected from the group consisting of static casting and spin casting.

42. The method of embodiment 41 further comprising the step of exposing the polymerized materials to a solvent selected from the group consisting of water, 2-propanol, etc. and mixtures thereof.

43. The method of embodiment 42 further comprising the step of autoclaving the polymerized material in water or buffer solution.

44. The UV blocking contact lens of embodiment 7 having a Wilhelmy Plate area loop of between 0.91 and 1.83.

45. The UV blocking hydrogel contact lens of embodiment 10 having a Wilhelmy Plate area loop of between 0.91 and 1.83.

46. The method of one or more of embodiments 1(a-d), alone or in any combination in full or portion thereof, as modified by any one of embodiments 2-6 or 13-43.

47. The method of one or more of embodiments 1(a-d), alone or in any combination in full or portion thereof, as modified by any combination of embodiments 2-6 or 13-43.

48. The contact lens of embodiment 7 as modified by combination of embodiments 8, 9 and 44.

49. The contact lens of embodiment 10 as modified by on combination of embodiments 11, 12 and 45.

50. A method of making a substantially fully polymerized UV blocking hydrogel lens comprising:
polymerizing a monomer reaction mixture of at least NVP and one other comonomer and a free-radical polymerizable Bis O-hydroxy benzophenone to provide a substantially fully polymerized hydrogel ophthalmic device.

51. The method of embodiment 50 wherein the substantially fully polymerized hydrogel ophthalmic device has a wettable surface as determined by a method selected from the group consisting of advancing contact angle and receding contact angle.

52. The method of embodiment 50 or 51 wherein the hydrogel ophthalmic device demonstrates sufficient blocking of UV light to meet at least FDA Class II specifications for UV blocking.

53. The method of embodiment 50 further wherein the step of polymerizing produces substantially full co-curing of a monomer system component of the monomer reaction mixture to provide a substantially fully copolymerized ophthalmic device.

54. The method of embodiment 50, wherein the free-radical polymerizable Bis O-hydroxy substituted benzophenone is selected from the group consisting of 1,3-Bis(4-benzoyl-3-hydroxyphenoxy)-2-propyl acrylate and 1,3-Bis(4-benzoyl-3-hydroxyphenoxy)-2-propyl methacrylate and mixtures thereof.

55. The method of embodiments 50 or 53, wherein the substantially fully copolymerized ophthalmic device has an equilibrium water content of about 42.3% to about 59.1% when fully hydrated.

56. The method of embodiments 50 or 53, wherein the substantially fully copolymerized ophthalmic device has a receding contact angle of about 21.

57. The method of embodiments 50 or 53, wherein the substantially fully copolymerized ophthalmic device has an advancing contact angle of between about 29 and about 33.

58. A UV blocking contact lens demonstrating sufficient blocking of UV light to meet at least FDA Class II specifications for UV blocking containing entrained PVP and having a water content of about 42.3% to about 59.1% when fully hydrated.

59. The UV blocking contact lens of embodiment 58 having a receding contact angle of about 21.

60. The UV blocking contact lens of embodiment 58 having a advancing contact angle of between about 29 and about 33.

61. A UV blocking silicone hydrogel contact lens demonstrating sufficient blocking of UV light to meet at least FDA Class II specifications for UV blocking containing entrained PVP and having a having a water content of about 42.3% to about 59.1% when fully hydrated.

62. The UV blocking silicone hydrogel contact lens of embodiment 61 and having a receding contact angle of about 21.

63. The UV blocking silicone hydrogel contact lens of embodiment 61 and having a advancing contact angle of between about 29 and about 33.

64. The method of embodiment 50 wherein the free-radical polymerizable Bis O-hydroxy benzophenone is functionalized with a free-radical polymerizable group selected from the group consisting of free-radical polymerizable mono acrylate containing groups or free-radical polymerizable mono methacrylate containing groups.

65. The method of embodiment 50, wherein the substantially fully copolymerized UV blocker containing ophthalmic device has a Wilhelmy Plate area loop of between 0.91 and 1.83.

66. The method of embodiment 50, wherein the monomer mixture further comprises a organosilicon-containing hydrophobic monomer.

67. The method of embodiment 64 wherein the organosilicon-containing monomer is present at between 0.1 to 75.8 percent by weight.

68. The method of embodiment 64 wherein the organosilicon-containing monomer is present at between 2 to 20 percent by weight.

69. The method of embodiment 64 wherein the organosilicon-containing monomer is present at between 5 to 13 percent by weight.

70. The method of embodiment 65 wherein the monomer mixture further comprises non-organosilicon-containing hydrophobic monomers.

71. The method of embodiment 70 wherein the non-organosilicon-containing hydrophobic monomers are present at about 0 to 60 percent by weight.

72. The method of embodiment 70 wherein the non-organosilicon-containing hydrophobic monomers are selected from the group consisting of alkyl acrylates and alkyl methacrylates.

73. The method of embodiment 64 wherein the monomer mixture further comprises a bulky monomer selected from the group consisting of methacryloxypropyl tris(trimethylsiloxy) silane (TRIS), pentamethyldisiloxanyl methylmethacrylate, tris(trimethylsiloxy)methacryloxy propylsilane, phenyltretramethyl-disiloxanylethyl acrylate, methyl-di(trimethylsiloxy)methacryloxymethyl silane, 3-[tris(trimethylsiloxy)silyl]propyl vinyl carbamate, 3[tris(trimethylsiloxy)silyl] propyl allyl carbamate, and 3-[tris(trimethylsiloxy)silyl] propyl vinyl carbonate, and mixtures thereof.

74. The method of embodiment 73 wherein the bulky monomer is present at greater than 0 to 41.2 percent by weight.

75. The method of embodiment 73 wherein the bulky monomer is present at greater than 34 to 41 percent by weight.

76. The method of embodiment 73 wherein the bulky monomer is present at greater than 25 to 41 percent by weight.

77. The method of embodiment 64 wherein the monomer mixture further comprises a hydrophobic crosslinkers selected from the group consisting of ethylene glycol dimethacrylate (EGDMA), allyl methacrylate (AMA) and mixtures thereof.

80. The method of embodiment 77 wherein the hydrophobic crosslinkers is present at between 0 to 76 percent by weight.

81. The method of embodiment 77 wherein the hydrophobic crosslinkers is present at between 2 to 20 percent by weight.

82. The method of embodiment 77 wherein the hydrophobic crosslinkers is present at between 5 to 13 percent by weight.

83. The method of embodiment 64 wherein the monomer mixture further comprises a slow reacting hydrophilic monomer in addition to NVP.

84. The method of embodiment 32 wherein the slow reacting hydrophilic monomer is 1-vinylazonan-2-one.

85. The method of embodiment 15 wherein the monomer mixture further comprises a fast reacting hydrophilic monomer.

86. The method of embodiment 85 wherein the fast reacting hydrophilic monomer is selected from the group consisting of unsaturated carboxylic acid containing monomers, acrylic substituted alcohol containing monomers, acrylamides containing monomers and mixtures thereof.

87. The method of embodiment 85 wherein the fast reacting hydrophilic monomer is selected from the group consisting of methacrylic acid, acrylic acid, 2-hydroxyethyl methacrylate, 2-hydroxyethyl acrylate, methacrylamide, N,N-dimethylacrylamide (DMA), N-isopropylacrylamide (NIPAM) and mixtures thereof.

88. The method of embodiment 85 wherein the fast reacting hydrophilic monomer is present at between 25 to 60 percent by weight.

89. The method of embodiment 85 wherein the fast reacting hydrophilic monomer is present at between 30 to 50 percent by weight.

90. The method of embodiment 85 wherein the fast reacting hydrophilic monomer is present at between 35 to 45 percent by weight.

91. The method of embodiment 83 wherein the slow reacting hydrophilic monomer is present at between 25 to 65 percent by weight.

92. The method of embodiment 83 wherein the slow reacting hydrophilic monomer is present at between 30 to 55 percent by weight.

93. The method of embodiment 83 wherein the slow reacting hydrophilic monomer is present at between 35 to 45 percent by weight.

94. The method of embodiment 50 wherein the monomeric mixture further comprises at least one slow reacting hydrophilic monomer, at least one ethylenically unsaturated hydrophobic monomer and an organic diluent and comprising a combined step of shaping and polymerizing by a method step selected from the group consisting of static casting and spin casting.

95. The method of embodiment 94 further comprising a step of exposing the polymerized materials to a solvent selected from the group consisting of water, 2-propanol, etc. and mixtures thereof.

96. The method of embodiment 94 further comprising a step of autoclaving the polymerized material in water or buffer solution 97. The UV blocking contact lens of embodiment 58 having a Wilhelmy Plate area loop of between 0.91 and 1.83.

98. The UV blocking silicone hydrogel contact lens of embodiment 62 having a Wilhelmy Plate area loop of between 0.91 and 1.83.

Having thus described the inventive concepts and a number of exemplary embodiments, it will be apparent to those skilled in the art that the invention may be implemented in various ways, and that modifications and improvements will readily occur to such persons. Thus, the embodiments are not intended to be limiting and presented by way of example only.

The invention is limited only as required by the following claims and equivalents thereto.

What is claimed is:

1. A UV blocking contact lens, blocking more than 70% UVA light and more than 95% UVB light, containing entrained polyvinylpyrrolidone and having an equilibrium water content of about 42.3% to about 59.1% when fully hydrated, wherein the lens is formed from a reaction mixture comprising at least N-vinylpyrrolidone and at least one other comonomer and a free-radical polymerizable, substituted or unsubstituted, Bis O-hydroxybenzophenone, wherein polyvinylpyrrolidone is formed in situ during cure of the reaction mixture, and wherein the reaction mixture from which the lens is formed comprises an organosilicon-containing hydrophobic monomer present at between 0.1 to 75.8 percent by weight.

2. The UV blocking contact lens of claim 1 having a receding contact angle of about 21 degrees as measured by captive bubble technique.

3. The UV blocking contact lens of claim 1 having an advancing contact angle of between about 29 and about 33 degrees as measured by captive bubble technique.

4. The UV blocking contact lens of claim 1 wherein the Bis O-hydroxybenzophenone is selected from the group consisting of 1,3-Bis(4-benzoyl-3-hydroxyphenoxy)-2-propyl acrylate and 1,3-Bis(4-benzoyl-3-hydroxyphenoxy)-2-propyl methacrylate and mixtures thereof.

5. The UV blocking contact lens of claim 4 having a receding contact angle of about 21 degrees as measured by captive bubble technique.

6. The UV blocking contact lens of claim 5 having an advancing contact angle of between about 29 and about 33 degrees as measured by captive bubble technique.

7. A UV blocking silicone hydrogel contact lens, blocking more than 70% UVA light and more than 95% UVB light, containing entrained polyvinylpyrrolidone and having a water content of about 42.3% to about 59.1% when fully hydrated, wherein the lens is formed from a reaction mixture comprising at least N-vinylpyrrolidone and at least one other comonomer and a free-radical polymerizable, substituted or unsubstituted, Bis O-hydroxybenzophenone, wherein polyvinylpyrrolidone is formed in situ during cure of the reaction mixture, and wherein the reaction mixture from which the lens is formed comprises an organosilicon-containing hydrophobic monomer present at between 0.1 to 75.8 percent by weight.

8. The UV blocking silicone hydrogel contact lens of claim 7 and having a receding contact angle of about 21 degrees as measured by captive bubble technique.

9. The UV blocking silicone hydrogel contact lens of claim 7 and having an advancing contact angle of between about 29 and about 33 degrees as measured by captive bubble technique.

10. The UV blocking silicone hydrogel contact lens of claim 7 wherein the Bis O-hydroxybenzophenone is selected from the group consisting of 1,3-Bis(4-benzoyl-3-hydroxyphenoxy)-2-propyl acrylate and 1,3-Bis(4-benzoyl-3-hydroxyphenoxy)-2-propyl methacrylate and mixtures thereof.

11. The UV blocking silicone hydrogel contact lens of claim 10 having a receding contact angle of about 21 degrees as measured by captive bubble technique.

12. The UV blocking silicone hydrogel contact lens of claim 11 having an advancing contact angle of between about 29 and about 33 degrees as measured by captive bubble technique.

* * * * *